June 7, 1938.  H. HAUSRATH  2,120,178
ELECTROMAGNET DEVICE
Filed April 3, 1934  5 Sheets-Sheet 1
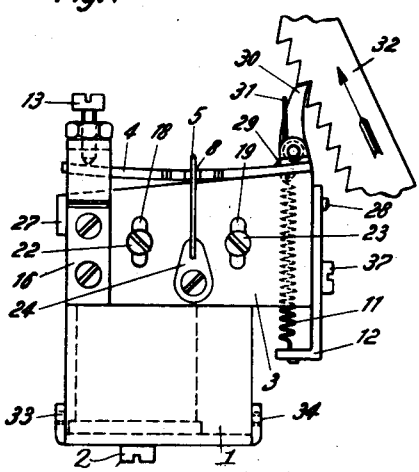
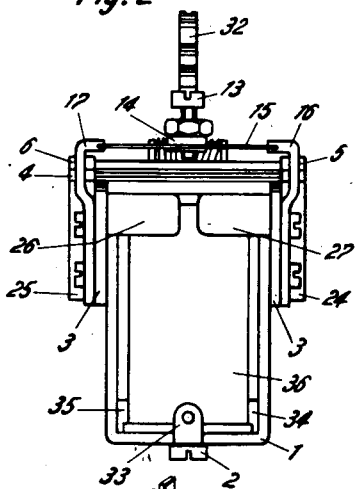
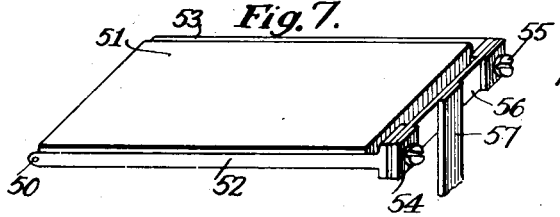
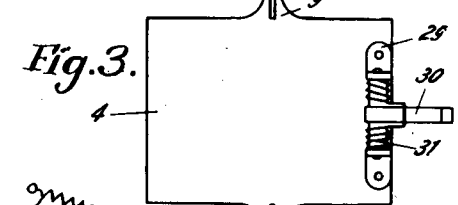
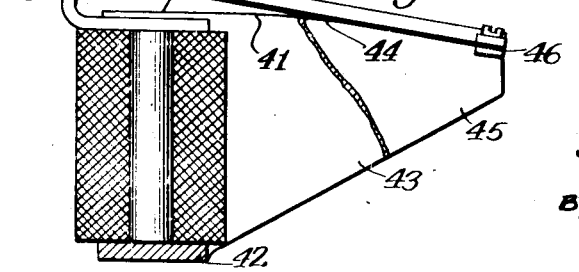
Inventor
Herbert Hausrath
By Dowell & Dowell
Attorneys June 7, 1938. H. HAUSRATH 2,120,178
ELECTROMAGNET DEVICE
Filed April 3, 1934 5 Sheets-Sheet 2
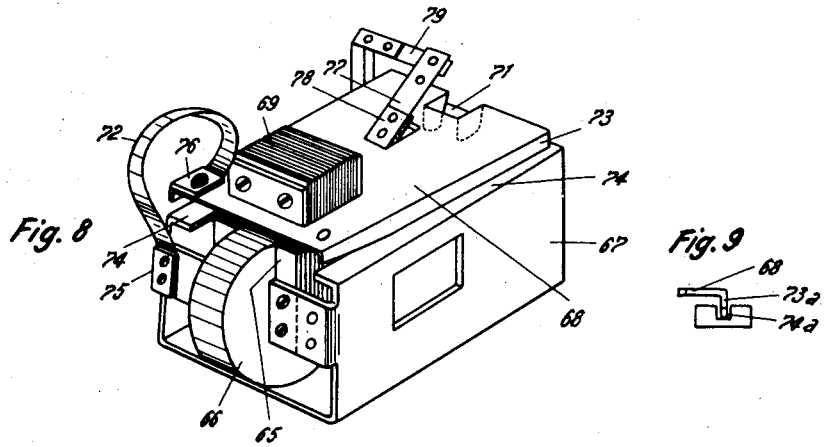
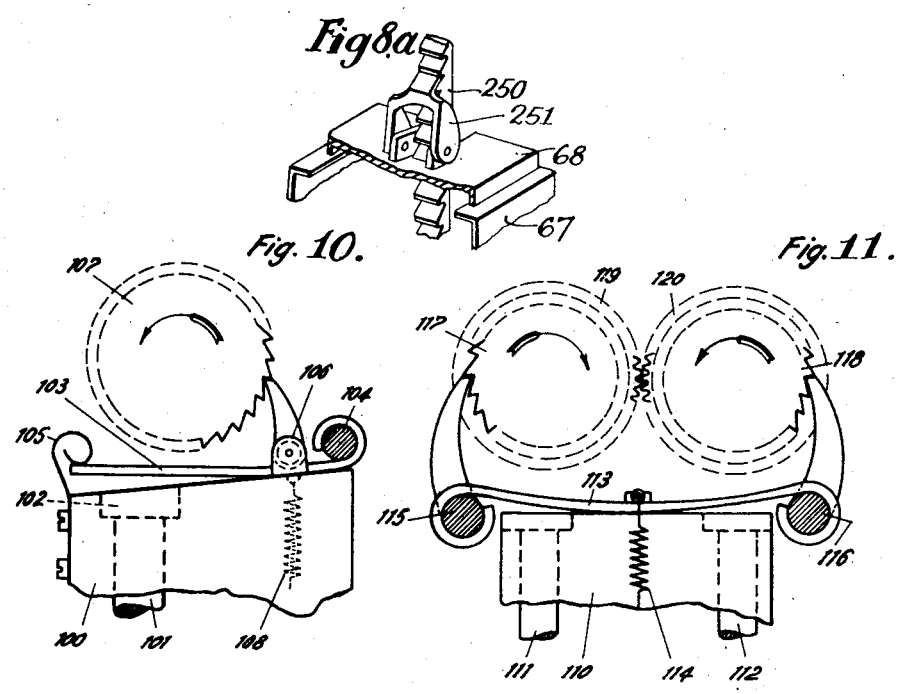
Inventor
Herbert Hausrath
By Dowell & Dowell
Attorneys June 7, 1938.  H. HAUSRATH  2,120,178
ELECTROMAGNET DEVICE
Filed April 3, 1934   5 Sheets-Sheet 3

Inventor
Herbert Hausrath
By Dowell & Dowell
Attorneys

June 7, 1938.  H. HAUSRATH  2,120,178
ELECTROMAGNET DEVICE
Filed April 3, 1934   5 Sheets-Sheet 4
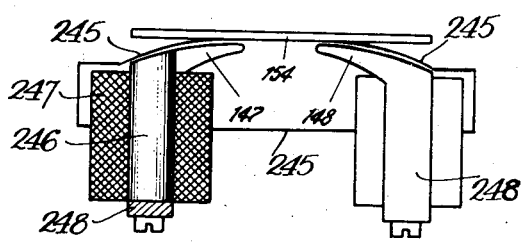
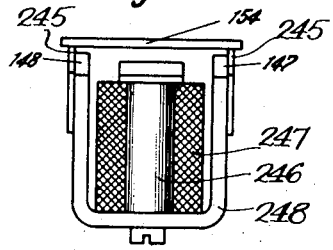
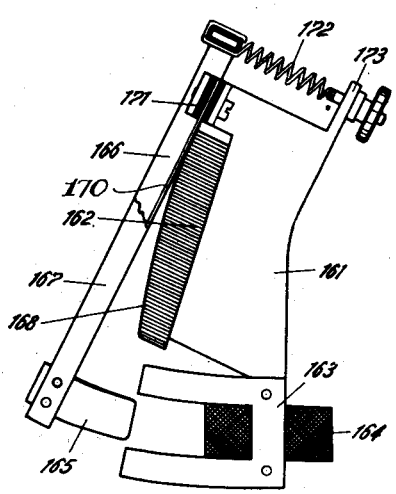
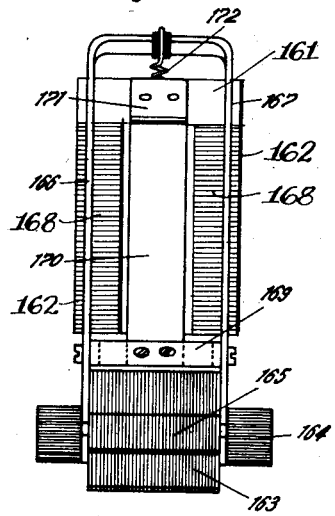
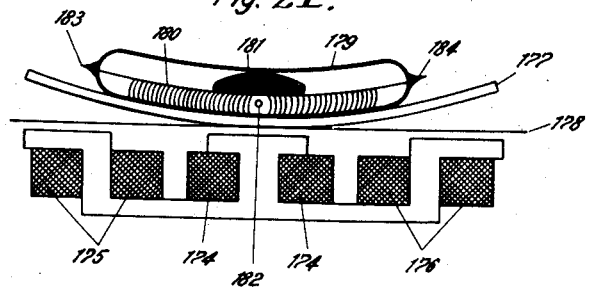

June 7, 1938.  H. HAUSRATH  2,120,178
ELECTROMAGNET DEVICE
Filed April 3, 1934    5 Sheets-Sheet 5

Inventor
Herbert Hausrath
By Dowell & Dowell
Attorneys

Patented June 7, 1938

2,120,178

UNITED STATES PATENT OFFICE 2,120,178

ELECTROMAGNET DEVICE

Herbert Hausrath, Karlsruhe, Germany

Application April 3, 1934, Serial No. 718,846
In Germany January 27, 1930

9 Claims. (Cl. 175—336)

This invention relates to electromagnets.

According to the invention, an electromagnet is provided with a continuous surface (hereinafter referred to as a "guide curve") which extends from a point near the pole pieces of the electromagnet to a point remote from the said pole pieces and with an armature formed as a rocker or rigidly fixed to a rocker and arranged so as to roll on the said guide curve. Various arrangements are possible for causing the armature to roll on the guide curve. For example, the armature (or a member to which it is rigidly attached) can have a flat surface through which it rests on a suitably curved guide curve; or it can have a curved surface through which it rests on a flat or suitably curved guide curve.

In the preferred arrangement, one end of the rocker normally rests on the end of the guide curve which is remote from the effective pole face of the electromagnet and this end may be arranged so as to transmit to a suitable driving device the movement made by the armature when the latter is attracted by the electromagnet. With such an arrangement, the effective driving or power transmission movement is made during the attraction of the rolling armature and the driving force which is thus exerted by the armature during its movement of attraction can, by suitable design of the guide curve and the rocker, be directly suited to the force required by the driven device.

At the beginning of the driving step, a large force is, as a rule, necessary but as soon as the driven device is set in movement, the force required rapidly decreases. In order to avoid an acceleration of the movement of the driven device, the driving force exerted at the end of the movement of the rolling armature is small.

The use of the rolling armature for the direct drive of a progressive switching device, in addition to providing for complete adaptation of the driving force exerted by the armature to the force requirements of the driven device, also allows the progressive switching to take place at substantially higher speeds than in the so-called indirect drives. With relatively small electromagnets, large progressive switching devices which are heavy compared with the electromagnet, can be progressively switched with certainty. Thus, the invention is particularly suitable for the drive of step by step switching devices such as are used for selectors in automatic telephone installations.

In order that the invention may be thoroughly understood and be more readily carried into effect, some examples of construction in accordance therewith will now be described with reference to the accompanying drawings, in which:—

Figures 1 and 2 show one form of construction of an electromagnetic step by step switching device in accordance with the invention in side elevation and front elevation respectively;

Figures 3, 4 and 5 show details of construction of the device shown in Figures 1 and 2;

Figure 6 shows a modified form of construction;

Figure 7 shows a method of mounting the armature in a construction such as is shown in Figure 6;

Figure 8 shows the electromagnet of a device in accordance with the invention which can be energized both by alternating current and by direct current;

Figure 8a is a fragmentary view illustrating a detail of Figure 8;

Figure 9 shows a detail of the arrangement shown in Figure 8;

Figure 10 shows a device which can be acted upon by the armature of an electromagnet in accordance with the invention to produce a rotary movement;

Figure 11 shows a device similar to that of Figure 10 which can be acted upon by the armatures of two electromagnets;

Figures 14–18 show various forms of construction of these devices;

Figures 19 and 20 show devices in accordance with the invention having an armature constructed as a regulator;

Figure 21 shows a regulator which can be influenced by three electromagnets;

Figure 12:
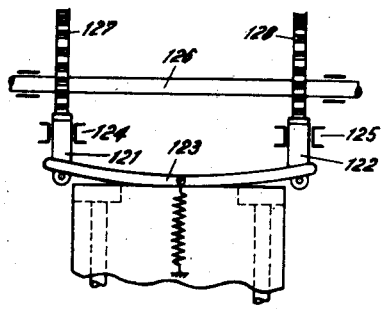
Figure 12 shows diagrammatically a device for transmitting the movement of two armatures.

In the form of construction illustrated in Figures 1–5, two frame-forming plates 3 rigidly connected together are fitted on the yoke 1 of an electromagnet to which the magnet core, not illustrated, is attached by means of the screw 2. The upper edges of these plates 3 provide a surface on the magnet frame upon which the armature 4 which is rigid and which, as seen in Figure 1, is curved, can roll. This surface is, in this case, flat but is not necessarily flat and in all cases it will be referred to as the "guide curve". Two springs 5 and 6 which engage in the slots 7 and 8 in the extensions 9 and 10 of the armature 4 are fitted on the plates 3 by means of the members 24, 25, and prevent the armature from sliding off the guide curve during its attraction movement. A spring 11 attached at one end to one end of the armature 4 is attached at the other to a member 12 which is adjustably mounted on the plates 3 and can be fixed by means of a screw 37. A pin 28 in a member connecting the plates 3 acts as a guide for the member 12.

In the normal or unattracted position, (Figure 1) the left hand end of the armature 4 makes contact with an adjustable stop formed by a screw 13 provided with a lock nut. The screw 13 is carried on a steel spring 15 which is arranged between carriers 16 and 17 fixed to the plates 3. A pawl 30 is pivotally mounted in a bearing bracket 29 fixed to the armature 4 at the end to which the spring 11 is attached and is held in engagement with the teeth of a rack 32 by means of a spring 31.

The plates 3 are fixed to the yoke 1 by means of screws 22 and 23 which pass through slots 18, 19, 20 and 21 in the plates 3. It is thus possible to adjust the distance between the guide curve of the magnet frame and the pole faces of the magnet. The coil 36 for energizing the magnet is arranged on a core, which is attached to the U-shaped yoke 1 by the screw 2. The pole piece of the core lies in the same plane as the edges of the legs of the yoke 1. Lugs 33, 34 and 35 are provided on the yoke 1 for fixing the magnet to a frame.

The manner in which the magnet operates is as follows:

In the normal, unenergized condition, the armature 4 is held by the spring 11 and by the weight of the rack 32 in the position illustrated in Figure 1. When current flows through the coil 36 and energizes the magnet, the left hand end of the armature is attracted towards the pole of the magnet. Owing to the shape of the armature, the result of this is that the armature rolls upon the track formed by the upper edges of the plates 3 and the arrangement is so dimensioned and set that the pawl 30 thus raises the rack 32 by one tooth. Owing to the large air gap, the attractive force of the magnet is only small at the beginning of the movement but the maximum leverage is available, while, on the other hand, the mass of the rack 32 which is to be accelerated and the friction of the parts associated with it, as well as the force of the spring 11, which tend to oppose the movement, act with a minimum leverage. As the armature moves nearer the pole, the air gap becomes smaller and the force of attraction of the magnet continuously increases and at the same time the ratio of the lever arm on which the opposing forces act, alters so that while the lever arm of the attractive force becomes continuously smaller, that of the resistance becomes continuously greater. The armature 4 is moved towards a final position determined by the condition of equilibrium of the two opposing turning moments until it is arrested by a stop (which is not illustrated) for the pawl 30 or for the armature 4 or when the turning moment acting on the pawl 30 has diminished. As shown in Fig. 1, the guide curve or curves of the magnet frame can be prolonged slightly beyond the pole face of the magnet so that the armature, when it is attracted, owing to its acceleration, overshoots the position in which the air gap is a minimum, and is thus returned by the magnet into said position.

The particular shape of the guide curves and of the surface cooperating with it to produce the required rolling movement depends upon the law of variation of the resistance which opposes the movement of the armature. When using the magnet to drive a step-by-step switch, the curves and the said surface are preferably shaped relatively to each other so that the accelerating force acting at the point in the system to be driven at which the force is exerted remains constant from beginning to end of the movement of the armature. In this way, the pawl is subjected to the smallest stress. The arched guide curve can also be discontinued shortly before the pole pieces are reached and may be continued, possibly, in a straight line, in the region beyond the pole pieces so that the armature tilts about the line determined by the point at which the curvature of the guide curve changes. The distance of this point from the pole pieces, which determines the minimum leverage with which the magnetic force acts, depends on what force is still to be transmitted at the end of the attraction movement.

The springs 5 and 6 of the electromagnet illustrated in Figures 1-5 which prevent the armature 4 from sliding off the guide curve of the magnet frame can be replaced by resilient pins. The arrangement of these guiding members outside the guide curve of the armature has the advantage that the continuous movement of the armature on the guide curve of the frame is not interrupted.

Figure 6 shows an electromagnet in which the guiding members for the armature are of a different construction. To the yoke 42 are fixed two plates 43 and 45, the curved upper edges 41 and 44 of which form the guide curve of the frame. The plates 43 and 45 are provided with lugs or brackets 46 in which two leaf springs 47 which rest on the upper surfaces of the plates 43 and 45 are clamped. The armature 49 is ground smooth and is provided, at one end, with two lugs or brackets 48 to which on the outside of the guide curves the free ends of the leaf springs 47 are clamped. The right hand end of the armature is free and in the normal, unattracted position the parts take up the position shown in full lines in Figure 6. When the armature is fully attracted, the springs 47 conform nearly to the curvature of the surfaces 41 and 44 while the right hand end of the armature lifts free from the springs 47.

If the leaf springs 47 are made sufficiently wide their lateral stiffness alone will be sufficient to prevent the armature from slipping laterally off the guide curve formed by the surfaces 41 and 44. The plates 43 and 45 may also be made of electromagnetic material so that the magnetic flux is partly returned through them in any position of the armature. By these means, in every position of the armature, there is a force acting on it which tends to hold it on the plates 43 and 45.

The described connection of the left end of the armature 49 to the right end of said guide curves 41 and 44, as shown in Fig. 6, may, instead of the leaf springs 47 represented by the thick black line in said figure, be formed by some other non-rigid means, such as bands, cords or chains, correspondingly placed, the purpose being to prevent longitudinal movement of the armature on said guide curves. In order to keep these connecting means tensioned in any position of the armature, a tensioning spring such as that shown at 59 in Figure 6 may be provided which always exerts a pull on the armature. Instead of or in addition to a tensioning spring, the end of the armature and the pole face can be specially formed so that an additional and longitudinal magnetic pull is exerted on the armature when the electromagnet is excited. For this purpose, the face of the magnet pole has been shown provided with an extension 63 past which a corresponding extension 64 of the armature moves in a substantially parallel direction when the armature moves. An extension of this nature can also lead to an increase in the magnetic attracting force in the normal position of the armature.

A further form of construction for the guiding members for the armature is illustrated in Figure 7. In this figure, the springs 47 of Figure 6 are replaced by rods 52 and 53 pivoted on the armature 51 at 50. The right hand ends of these rods are connected by means of the screws 54 and 55 to a leaf spring 56 which is itself fixed to the part 57 of the magnet frame. The leaf spring 56 will, of course, always tend to return the rods 52 and, therefore, the armature 51 into the normal, unattracted position shown in Figure 7.

In the construction illustrated in Figure 8, the laminated core 65 which carries the coil 66, is fixed in a U-shaped frame 67, the free limbs of which form the armature guide curves 74 which, as seen, are flat surfaces.

The laminated armature 69 is fixed in a plate 68 which has two portions 73 having curved lower surfaces which co-operate with the guide curves 74. At the end of the plate 68 which is remote from the armature 69, a slot 71 is provided, through which a rack 250 (see Fig. 8a) passes. With this rack a pawl 251, arranged at the same end of the plate 68 engages. Said slot 71 in the plate 68 acts at the same time as a guide for the armature. A spring 72, which is constructed so that it can be bent to a sufficient extent in the direction in which the armature is attracted but at the same time possesses sufficient stiffness to prevent lateral displacement, engages with the end of the armature which is situated in front of the surfaces of the poles. In Figure 8, two such springs are provided but the foremost spring is omitted from the drawings. Obviously, a single spring which acts on the centre of the armature can also be used. The spring may also, in some cases, be constructed so that when the armature moves beyond its position of rest, it reverses the direction of the force exerted by it on the armature and thus limits the amplitude of the oscillations of the armature.

The form of construction illustrated in Figure 8 having a laminated core and armature is especially suitable when the magnet is energized by alternating current. In order that the armature may be guided with certainty, the guide curves 74 on the magnet casing may be slotted instead of being flat as shown. Such a construction is illustrated in Figure 9. Here, the downwardly bent portion 73a of the armature plate 68 is curved on its lower surface and engages in the slot 74a which is connected to the magnet casing 67 and takes the place of the guide curve 74 in Figure 8.

In Figure 8, there is also a contact spring 77 fixed to a flap 78 on the armature plate 68. The spring 77 in the unattracted position of the armature is in contact with a contact spring 79 attached to the magnet frame. The springs 77 and 79 accordingly form a make and break contact which is opened when the armature is attracted and can thus be used for controlling the energizing circuit of the magnet. The contact spring 77 is preferably supplied with current through the spring 72 which, for this purpose, is fixed at 75 to the magnet casing and at 76 to the armature plate so as to be insulated therefrom.

The magnet casing 67 and the plate 68 which carries the armature 69 can be made of insulating material. The contact surfaces 74 can be made of highly elastic material so that noisy working of the magnet is avoided.

Figure 10 shows an electromagnet, the armature of which is provided with a balance weight. The core 101 having a pole 102 is fixed to the magnet casing 100. The upper edge of the magnet casing 100 forms the guide curve for the armature 103. One end of the armature carries a balance weight 104 while the opposite end of the armature which is above the pole 102 is attached to a return spring 105. This spring is untensioned when it reaches the return position. The armature has a pawl 106 which engages with a ratchet wheel 107. The additional return spring 108, which holds the armature in the unattracted position, illustrated in the figure, engages with the armature at the point of attachment of the pawl. The balance weight 104 is provided near the pivot of the pawl and is preferably made in the form of a bar around which the armature is bent.

Driving devices of this kind are particularly suitable for driving apparatus, the driven member of which meets with a resistance which increases towards the end of each step so that the kinetic energy is entirely absorbed at the end of each step. Any variations in the resisting forces which occur during the stroke of the armature, that is to say, the resistances which oppose the movement of the wheel 107 and which cannot be taken into account in the design of the guide curve are overcome by the provision of the balance weight 104. In the electromagnets known at the present time and used for causing step by step movements, the fitting of balance weights is impracticable since, owing to the weight of the latter, the momentum at the end of each step would be too great. By employing an armature which rolls along the guide curve of the casing, rebounding movements due to this cause are reduced to such an extent as to be harmless.

Figure 11 shows a further form of construction in which two driving pawls are employed. In this figure, two cores 111 and 112 are provided in the magnet casing 110. The armature 113 rests on the magnet casing and a spring 114 may serve to hold it in the position illustrated. The two pawls (shown but not lettered) are attached to the two ends of the armature by means of the two bearing bars 115 and 116. Said spring 114 functions to cause the armature 113 to drop down or slide upon the casing as a base. However, this spring is not intended to return or force the armature back into a definite position after termination of the excitation of the magnet. It can, therefore, be replaced by any other means for guiding the armature, as for example, by a construction of armature and guide bars according to Fig. 9. Said pawls drive the ratchet wheels 117 and 118 which are fixed to toothed wheels 119 and 120 respectively. The two toothed wheels are in engagement and operate so as to transmit a continuous movement.

When the electromagnet shown in Fig. 11 is set in operation, either the electromagnet 111 or the electromagnet 112 must be excited. If the electromagnet 111 is excited, the left end of the armature 113 will be attracted to the pole shoe of this magnet, while the right end of the armature will be raised and the right pawl attached to the bearing 116 will turn the gear 118 in the direction of the arrow. The left pawl attached to the bearing 115 is thereby applied under a tooth of gear wheel 117, which, on rotation of gear 118, is likewise rotated by means of associated gears 119 and 120. This apparatus is intended for drive systems which are controlled by a pawl or the like, so as to prevent any rotating backward, so that it remains as a result of friction in the same position to which it has been last carried. The armature 113, therefore, remains in position upon termination of the excitation of magnet 111, that is, in that position to which it was last carried by the electromagnets. Only when the other electromagnet 112 is excited so as to attract the right end of the armature 113, is it possible to overcome the counterforce of the advanced system and the gear 117 become further advanced by means of the pawl connected with the bearing 115. This procedure is of course repeated with the alternate excitations of magnets 111 and 112.

Figure 12 illustrates diagrammatically a further arrangement for the transmission of the movement produced by a rolling armature provided with two pawls. In the form of construction illustrated in Figure 12, the pawls 121 and 122 which are arranged at the ends of the armature 123, are in engagement with two toothed wheels 127 and 128 which are fixed on a common shaft 126. The pawls 121 and 122 are prevented from making lateral movements by guides 124 and 125. At each attraction of the armature, one of the toothed wheels is advanced by one of the pawls so that the common shaft 126 is moved step by step.

A rolling armature which is actuated by two electromagnets can also be provided with a single driving member which is fitted in the centre between the two ends of the armature, as shown for example, in Fig. 13 which is hereinafter described.

In this figure, the armature 131 in the form of a plate rests on the curved guide 132 of the magnet casing which carries the two magnet coils 143 and 144. A tensioning band which is indicated in the drawings by dots is fixed to one end 133 of the armature 131 and to the opposite end 134 of the magnet casing 132, while a corresponding tensioning band indicated by crosses is fixed to the end 135 of the armature and the end 136 of the magnet casing. The two tensioning bands can be passed over the upper surface of the armature and in this way be combined to form a single band. The fastening means at the ends 133 and 135 of the armature are preferably of an elastic yielding nature.

A roller 138 on the lever 137 constructed as a driving member is pressed on to the middle of the armature by the spring 139. The lever 137 has a friction pawl 140 which makes contact with the periphery of the disc 141 mounted on the shaft 142. The lever 137 is also mounted on the shaft 142. When the magnet 143 or the magnet 144 is excited, the armature is moved out of the position illustrated in the figure. The lever 137 is at first only slightly raised and is then raised more quickly, and transmits its movement by means of the pawl 140 to the disc 141. In order to obtain a large amount of friction between the outer periphery of the disc 141 and the pawl 140, the disc 141 is preferably made of metal foils and a suitable filling material. Amber is particularly suitable as the filling material, the metal foils and the amber mass being arranged in layers and the material compressed at a high pressure and at a high temperature and afterwards ground.

Figure 13:
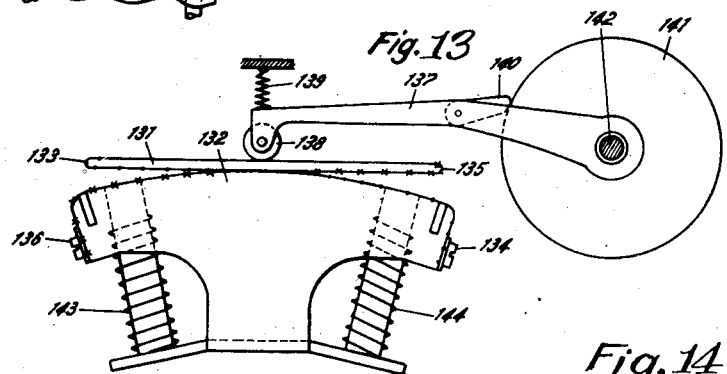
Figure 13 shows a device which can be acted upon by an armature controlled by two electromagnets.

The use of a single driving member or pawl arranged in the middle of the armature, as shown in Fig. 13, is of special value for driving systems in which the movement is not to take place in definite steps. The rolling armature may thus, after the energizing current which energizes alternatively the two magnets 143 and 144 has been switched on, gradually swing until its oscillations attain the desired amplitude. If the wheel 141 driven by the pawl 140 is provided with very fine teeth or if the transmission of power between the pawl and the driven member is effected solely by friction, then, when the exciting current for the magnet is switched on, the armature may, at first, make small oscillations which gradually become greater. The maximum amplitude of oscillation of the armature system is preferably limited by means of resilient stops. It can, however, also be limited by making provision for a state of equilibrium to be set up between the attractive power of the magnet and the resistance acting on the driven member at the maximum amplitude.

Figure 14:
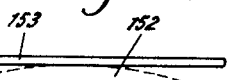
Figure 15:
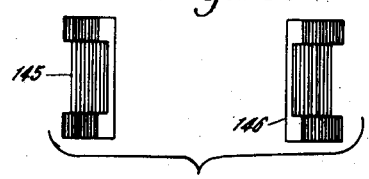

In the form of construction illustrated in Figure 13, the guide track 132 forms a part of the mounting yoke of the magnets 143 and 144, so that the magnet which is not excited forms at that time a shunt for the magnetic flux of the energized magnetic circuit. By means of the arrangement illustrated in side elevation in Figure 14 and in plan, with the armature plate removed, in Figure 15, this shunt is avoided. The two magnet cores 145 and 146 are in this instance U-shaped so that the magnet casing 152, on which the rocker or plate of the armature system 153 rolls and which can be made of non-magnetic material, may be fitted within and between the same. The plate can likewise be made of non-magnetic material, but it must then be provided with two armature pieces opposite the two electromagnets 145 and 146. If alternating current is used for energizing the magnets, the magnet cores 145 and 146 and the armature pieces are preferably laminated.

In the form of construction illustrated in side elevation in Figure 16, and in front elevation in Figure 17, an electromagnet is situated at each end of the guide curves 245, upon which the armature 154 can roll. Each electromagnet has a core 246, which bears a winding 247, and a U-shaped yoke 248 which is fixed to the casing bearing the guide curves 245 (Fig. 17). The U-shaped yoke 248 of each of the two electromagnets is provided with extensions 147 and 148 which project nearly to the center of the guide curves and which are situated slightly beneath the surfaces of said guide curves. The magnetic flux produced by the energization of the winding of one of said electromagnets, flowing from the pole of said electromagnet to the armature, has a return path of low reluctance over said extensions 147 and 148 of the yoke, the yoke and the core.

In the forms of construction illustrated in Figures 13 to 17, the rolling armature may be provided with an automatic circuit breaking contact which controls the energization of the two electromagnets. An automatic circuit breaking contact of this nature is provided in a similar manner to the arrangement illustrated in Figure 8. With the normal electromagnets with ordinary pivoted armatures which are used for stepping step-by-step switch devices, the armature always has to give a hammer blow at the end of the actuating step. In an electromagnet with a rolling armature as herein described, this is not necessary, because a large acceleration of the actuating member is produced at the very beginning of the movement of the armature. The movement of the rolling armature thus becomes greater and greater so that considerably smaller energizing currents are required by the electromagnets for controlling heavily loaded switch devices than for actuating a driving device always moved step by step and which has an ordinary pivoted armature.

A very good approximation to a uniform drive can be obtained by the use of two rolling armature systems which are energized 90° out of phase. The phase displacement can be obtained from a single phase by connecting a condenser in series with the energizing winding of one of the systems. The linkage between each of the two systems and the common mechanism they are to drive can be one of those illustrated in Figures 11 and 12.

Figure 18:
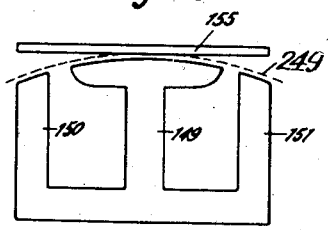

Figure 18 illustrates a magnet system having three limbs 149, 150 and 151, which are fixed in a suitable manner to the casing bearing the guide curves 249, upon which latter the armature 155 can roll. Each of the limbs 150 and 151 is adapted to bear an energization winding. This form of construction of the magnet system is particularly suitable if a winding exerting a polarizing action on the armature is to be provided. Such a polarizing winding can be fitted on the central core 149. It then produces a flux which flows in parallel through the two halves of the armature and the limbs 150 and 151. The windings on the limbs 150 and 151 are then connected in such a way that they produce a flux which flows from the limb 150 and through the armature 155 to the limb 151. Obviously, the permanent polarizing flux can also be produced by the windings fitted on the limbs 150 and 151, while the winding on the limb 149 produces the additional energization.

In magnet systems in which the armatures can be tuned to the frequency of the alternating current commonly available, it is also possible to magnetize one of the crossing magnetic circuits by means of direct current and the other by alternating current.

The guide curves of the magnet casing and surface or surfaces of the armature in contact with them may easily be so shaped or formed that the armature takes up positions which depend on the energization of the magnet and can thus be used as the moving member of an electrical measuring instrument. This property of the rolling armature magnet makes it particularly suitable for utilizing the armature directly for the control of contacts and thus as a regulating device. In this case, the rolling armature or a part to which it is rigidly fixed can serve directly as the contact member or a regulating resistance or switch may be fitted to the armature which influences a resistance in accordance with the energization of the armature. The electrical factor which influences the electromagnet may be the strength of a current or a voltage or a factor which can be measured on the watt meter principle. Further, an electromagnet of this kind can also be used for measuring the relation between two currents.

Figure 19 shows a regulating device which is controlled by a current or a voltage and Figure 20 shows the armature system of this instrument.

In the electromagnet illustrated in Figure 19, a contact member 162 in the form of a variable resistance and the laminated electromagnet 163 together with its winding 164 are mounted on the base plate 161. The armature 165 is fixed on the members 166 and 167, the lower surfaces of which roll on the contact path or faces 168 of the contact member 162. As is seen in Figure 20, this armature system is connected by the cross bar 169 and the leaf spring 170 to a clamping member 171 on the base plate 161. The members 166 and 167 are connected together and are drawn towards the lug or socket 173 on the base plate 161 by the spring 172. The electrical connection is made by the leaf spring 170 with the insulated clamping member 171. The members 166 and 167 are made of a material suitable for making the required contact. The regulating resistance 162 can also be made as a plate of resisting material.

When current flows through the winding 164, the members 166 and 167, or at least one of them, rolls on the contact determining path 168 so that the resistance is altered. The resistance may be connected as a simple regulating resistance, a potentiometer or a variable shunt.

The characteristics of the regulator are determined by the shape of the curves and tracks, the size of the air gap, the possible variations in the resistance and the force of gravity acting on the armature. The sensitivity can be altered in a simple manner by rotating the base plate 161 about a point (not shown) at which it is fixed to the frame, as well as by varying the tension of the spring 172 or by loading the armature.

A symmetrically constructed regulating magnet is illustrated in Figure 21. The winding 174 induces a flux which is distributed over the armature 177, while the windings 175 and 176 are connected in such a manner that they induce a flux which crosses that due to the winding 174 and which flows through the entire length of the armature. In this case, the armature 177 rolls on the guide curve 178. For actuating the regulator according to the electrical output, the winding 174 is connected, for example, to the voltage terminals and the current is conducted through the windings 175 and 176.

A noble metal resistance 180 wound on a quartz or glass rod and inserted in a bent glass tube 179 is used as the regulating resistance over which a bead of mercury 181 within said glass tube moves as the armature 177 rolls. A filling gas inside the tube acts as a damping medium, and for the purpose of controlling the amount of damping a longitudinal groove space is provided in the top of the glass wall which, owing to capillarity, is not filled by the mercury. The rod of the resistance element 180 might also be mounted in the top of the tube instead of in the bottom, in which case the mercury bead would make contact with the bottom of the resistance. Leads to the regulating resistances are provided in the middle at 182 and at the ends at 183 and 184. By arranging leads without an interposed resistance, the device becomes a simple connecting and disconnecting or reversing switch, a switch with various stages or a sequence switch as desired.

The apparatus can, if desired, be used on one side only, in which case the curves and the track, as well as the regulating resistance, need only extend on one side.

If, as illustrated in Figure 21, the apparatus is constructed with the track running substantially horizontally and gravity is used as the returning force, the sensitivity can be increased within the limits imposed by requirements as to stability by arranging the centre of gravity of the armature at a suitable height. The sensitivity can also be varied by the shape of the guide curves or the surface of the armature in contact with it. The biassing power is thus reduced by the rolling movement of the bead or ball of mercury, or by a ball or roller of any suitable metal so used. The greater the length of the curved track for the mercury or metal ball, the more will the biassing power which tends to set the armature in the normal position be reduced.

By using separate electromagnet systems for the coils 175 and 176, the symmetrical arrangement illustrated in Figure 21 can be used, like the apparatus shown in Figure 16, as a device operating on the quotient meter principle if the means indicated for adjusting the biassing power are used. The device can then be directly used for electrical regulation, control or switching in accordance with any conditions or values which can be represented by the relation between two currents or, in the case of values which are transmitted by the duration of impulses, by average current values.

The arrangement illustrated in Figure 21, when constructed in a form in which it has no biassing power, can be used as a phase angle regulator by suitable connection of the coils 174, 175 and 176.

In general, electromagnets with rolling armatures in accordance with the invention may be used as regulating or switching devices in controlling and protecting circuits in which they are operated in accordance with conditions which, for their determination, involve a measurement of current or voltage, or the product or the quotient of current and voltage.

Figures 22, 23:
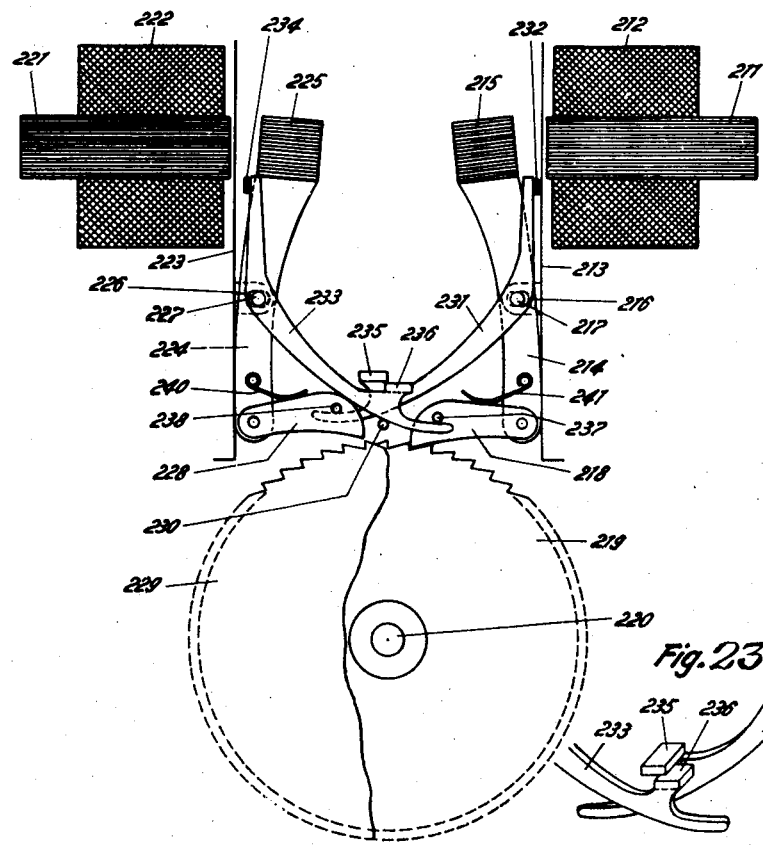
Figure 22 shows a device controlled by the two armatures of two electromagnets.
Figure 23 is a detail of construction of Figure 22.

In the arrangement illustrated in Figures 22 and 23, two electromagnets each having a rolling armature which acts on a ratchet wheel are provided. The pawls of each of the two armatures can be held down in engagement with the ratchet wheel by means of a locking device. The U-shaped core 211 of one of the electromagnets has a winding 212. The guide curve 214 of the armature 215 makes contact with the track 213 and can roll on this track. The rolling armature system is guided in free movement by the slot 216 upon a pin 217 fixed to the track 213. The free end of the guide curve 214 of the armature 215 carries the pawl 218 which is in engagement with the ratchet wheel 219 which is mounted to rotate on the shaft 220.

The other driving electromagnet also has a U-shaped core 221 on which the winding 222 is arranged. The armature system 224, 225 is guided similarly to the first one by a slot 226 on the pin 227 fixed to the track 223, so that it can roll freely on said track. A pawl 228 is pivotally mounted at the free end of the armature system 224, 225. This pawl engages with a ratchet wheel 229 which is also mounted on the shaft 220. The two ratchet wheels are moved in opposite directions when the armatures are attracted according to whether the electromagnet 211, 212 or the electromagnet 221, 222 is energized.

Two locking levers 231 and 233 are pivotally mounted on the stationary pins 217 and 227 which act as guides for the two armature systems. The lever 231 carries, at one end, an armature 232 which it attracted by the core 211 when the coil 212 is energized. The lever 233 likewise carries the armature 234 which is attracted by the core 221 when the coil 222 is energized. Each of these locking levers is in the form of a double armed lever. The free end of the lever 231 engages under a pin 238 on the pawl of the rolling armature system 224, 225 whereas the free end of the locking lever 233 engages under a pin 237 on the pawl 218 of the rolling armature system 214, 215. Both levers 231 and 233 are also provided with lateral extensions 235, 236 (see Figure 23) one of which always lies on the other. A fixed pin 230 acts as a support for the locking levers.

In the position illustrated in Figure 22, the extension 235 of the locking lever 231 lies on the extension 236 of the locking lever 233. The free end of the locking lever 231 therefore raises the pawl 228 of the rolling armature system 224, 225 out of engagement with the corresponding ratchet wheel 229.

If now the coil 222 is energized, the small armature 234 of the lever 233 is first attracted. During this movement, the left hand edge of the extension 236 is displaced so far to the right that the extension 235 of the lever 231 which lies upon it, loses its hold, the locking lever 231 falls downwards until its meets the fixed stop 230 and thus allows the pawl 228 of the rolling armature 224, 225 to drop under the influence of its spring 240 into engagement with the ratchet wheel 229. During the attraction of the rolling armature 225 which follows immediately, the ratchet wheel 229 is moved forward by the push of the pawl 228. When the coil 222 becomes de-energized, the armature 234 falls and the extension 236 of the lever 233 then lies on the extension 235 of the lever 231. The pawl 218 of the armature magnet 215 is thus held out of engagement with the ratchet wheel 219.

If the coil 222 is again energized, the pawl 228 of the armature 225 can now at once drive the ratchet wheel 229. If, on the other hand, the coil 212 of the magnet 211 is energized, the attraction of the armature 232 first releases the pawl 218 of the armature 215 and locks the pawl 228 of the armature 225.

Owing to the employment of the two mutually locking levers 231 and 233, only a single pawl can at any moment be in engagement with the corresponding ratchet wheel, so that the apparatus can be advanced, as required, only in one direction or in the other.

I claim:—

1. An electromagnetic device, comprising a frame, an electromagnet connected to said frame, two rigidly formed guide curves provided in said frame, the said electromagnet having at least one pole piece situated between said guide curves at one end of the latter and the said guide curves together providing a continuously formed surface and extending from said pole piece of the electromagnet to a point remote and free from said pole piece, and a rocker having a continuously formed surface extending over the same length as said guide curves of the frame, one end of said rocker being constructed as an armature of said electromagnet and said rocker being adapted to rock with a rolling motion freely upon said guide curves of the frame at each actuation of the said electromagnet, together with tracks connected to said rocker and tracks connected to said guide curves of said frame, one pair of said tracks being grooved.

2. An electromagnetic device, comprising a frame, an electromagnet connected to said frame, two rigidly formed guide curves provided in said frame, the said electromagnet having at least one pole piece situated between said guide curves at one end of the latter and the said guide curves together providing a continuously formed surface and extending from said pole piece of the electromagnet to a point remote and free from said pole piece, and a rocker having a continuously formed surface extending over the same length as said guide curves of the frame, one end of said rocker being constructed as an armature of said electromagnet and said rocker being adapted to rock with a rolling motion freely upon said guide curves of the frame at each actuation of the said electromagnet, together with non-magnetic tracks connected to said rocker and non-magnetic tracks connected to said guide curves of said frame, said last named tracks being grooved.

3. An electromagnetic device, comprising a frame, an electromagnet connected to said frame, two rigidly formed guide curves connected to said frame, said electromagnet having at least one pole piece situated between said guide curves at one end of said curves, said guide curves together providing a continuously formed surface and extending from said pole piece to a point remote and free from said pole piece, a rocker having a continuously formed surface extending over the same length as said guide curves of the frame, one end of said rocker being constructed as an armature of said electromagnet, an operating pawl for transmitting movements from said rocker to a movable device, said operating pawl being connected to the other end of said rocker, and said rocker being adapted to rock with a rolling motion freely upon said guide curves of the frame at each actuation of the electromagnet.

4. An electromagnetic device, comprising a frame, an electromagnet connected to said frame, said electromagnet having a U-shaped core of laminated iron and a coil located upon said core, two rigidly formed guide curves connected to said frame and the two pole pieces of said electromagnet being situated between said guide curves at one end of said curves, said guide curves together providing a continuously formed surface and extending from said pole pieces of the electromagnet to a point remote and free from said pole pieces, a rocker having a continuously formed surface extending over the same length as said guide curves of the frame, a laminated armature of said electromagnet connected to one end of said rocker, an operating pawl connected to the other end of said rocker, and said rocker being adapted to rock with a rolling motion freely upon said guide curves of the frame at each actuation of the electromagnet.

5. An electromagnetic step-by-step driving device comprising a plurality of frames, an electromagnet connected to each of said frames, a guide curve connected to each of said frames, an armature for each electromagnet adapted to roll on the guide curve of the frame of its associated electromagnet, a pawl connected to each armature, and a switch actuating device, said pawls being adapted to act in cyclic sequence on said switch actuating device.

6. An electromagnetic step-by-step driving device as claimed in claim 5, comprising a plurality of levers adapted to lock each other in the working position, each lever being associated with one electromagnet and being adapted to be controlled by the latter, the said levers acting on the specified pawls and each in its working position holding the pawl of the armature of an associated another electromagnet out of engagement with the switch actuating device.

7. An electromagnetic step-by-step driving device, comprising two frames, an electromagnet connected to each of said frames, a guide curve connected to each frame, an armature for each electromagnet adapted to rock with a rolling motion on the guide curve of the frame of its associated electromagnet, a pawl connected to each of said armatures, a switch actuating device, said pawls being adapted to act in cyclic sequence on said switch actuating device, a further armature for each electromagnet connected to a pivotally mounted bell-crank lever, said bell-crank lever of each of said electromagnets acting on the pawl of said other of the electromagnets and on energization of the appropriate electromagnet holding said pawl of the other electromagnet out of engagement with the switch actuating device.

8. An electromagnetic device according to claim 3, including further, a weight connected to the same end of the rocker as the said operating pawl connected thereto.

9. An electromagnetic device according to claim 3, including further, a return spring, one end of said spring being connected to the frame and the other end of said spring being connected to the same end of the rocker as the operating pawl.

HERBERT HAUSRATH.